No. 875,243.
PATENTED DEC. 31, 1907.
C. J. CRAMER.
LEVEL AND SQUARE.
APPLICATION FILED SEPT. 5, 1907.
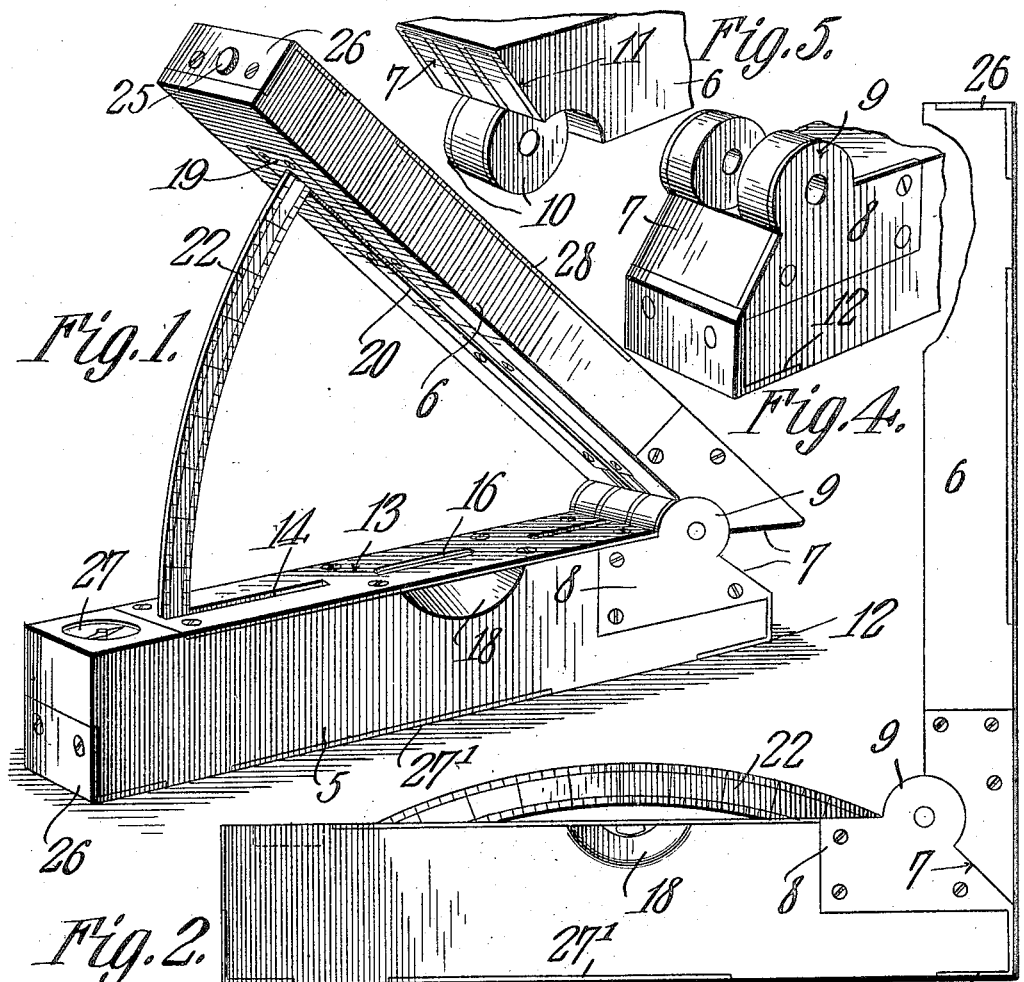
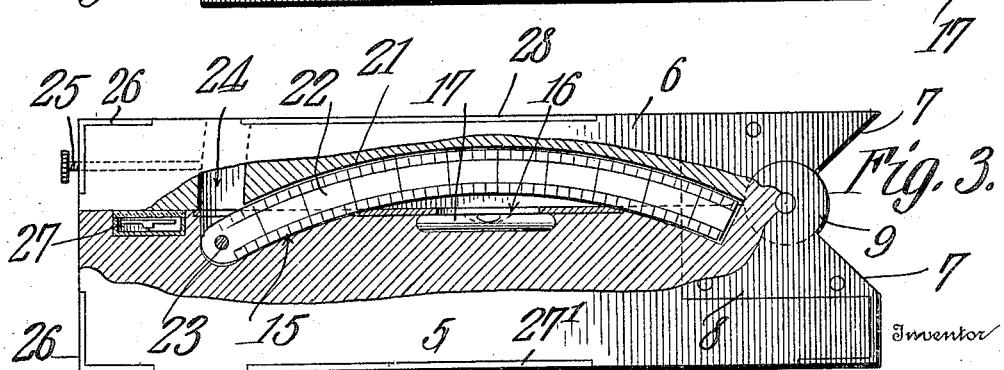
Witnesses
Inventor
Charles J. Cramer.
By
Attorneys

UNITED STATES PATENT OFFICE.

CHARLES JULYUS CRAMER, OF SEDRO WOOLLEY, WASHINGTON.

LEVEL AND SQUARE.

No. 875,243.　　　　Specification of Letters Patent.　　　Patented Dec. 31, 1907.

Application filed September 5, 1907. Serial No. 391,502.

*To all whom it may concern:*

Be it known that I, CHARLES JULYUS CRAMER, a citizen of the United States, residing at Sedro Woolley, in the county of Skagit and State of Washington, have invented a new and useful Level and Square, of which the following is a specification.

This invention relates to leveling instruments and more particularly to a combined level and folding square.

The object of the invention is to provide a combined instrument of the class described capable of being compactly folded for the transportation or shipment and which serves the dual function of a level and square.

A further object is to provide a leveling instrument having a compass combined therewith and provided with a graduated segment for determinating the altitude of any desired object.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a combined level and folding square constructed in accordance with my invention showing the instrument adjusted to determine the altitude of an object. Fig. 2 is a side elevation showing the instrument used as a square. Fig. 3 is a side elevation partly in section showing the pivoted legs or members in folded position. Fig. 4 is a perspective view of the hinge of one of the members. Fig. 5 is a similar view of the hinge of the mating member.

Similar numerals of reference indicate corresponding parts in all of the figures of the drawings.

The improved instrument forming the subject matter of the present invention comprises a pair of pivotally united members 5 and 6 having their pivoted ends inclined or beveled, as indicated at 7 thereby to permit the legs to be moved laterally to the position shown in Fig. 2 of the drawings and in which position the instrument may be used as an ordinary square.

Secured to the inner end of the member 5 is a bracket 8 provided with spaced perforated ear 9 between which are pivotally mounted a pair of spaced ears 10 carried by a corresponding bracket 11 secured to the adjacent end of the mating member 6, the material forming the body of the members 5 and 6 being curved to conform to the shape of the ears, as shown, thereby to reinforce and strengthen said ears and relieve the pivot point of excessive strains.

The bracket 8 is provided with an angular extension 12 which projects beneath the base of the member 5 to form a terminal wear plate while the bracket 11 extends at the rear of the member 6 and registers with the plate 12 when the legs are opened to their full extent so as to form a metal casing or housing at the pivotal juncture of said members.

Secured to the upper face of the pivoted member 5 is a longitudinally disposed plate 13 having elongated slots 14 formed therein and communicating with suitable openings 15 formed in the body of the member 5, there being an intermediate slot 16 formed in the plate 13 for displaying a spirit tube 17.

The spirit tube 17 is seated in a recess in the member 5 and formed on each side of the spirit tube are segmental recesses 18 so that the operator may see the bubble from either side of the casing when the latter is used for leveling purposes.

Counter-sunk in the inner face of the pivoted member 6 is a plate 19 having a longitudinally disposed slot 20 formed therein and communicating with an elongated opening 21 formed in the body of said member to accommodate the graduated segment 22 when the pivoted members are moved to the folded position shown in Fig. 3 of the drawings.

The segmental plate 22 is provided with a plurality of graduations some of which indicate degrees, and other inches and fractions thereof, one end of said plate being pivotally mounted at 23 in the opening 15, as shown.

The walls of the openings 15 and 21 are preferably curved to conform to the curvature of the segmental plate 22, there being a transverse recess 24 formed in the free end of the pivoted member 6 and communicating with the opening 21 for the reception of the free end of the segmental plate when the instrument is used for determining the altitude of any desired object.

Threaded in an opening in the free end of the member 6 is a clamping screw 25 by means of which the pivoted members may be locked in adjusted position. The free ends of the pivoted members are preferably provided with terminal angle brackets or wear plates 26, there being a compass 27 countersunk in the upper face of the member 5 above the adjacent wear plate, as shown.

When the pivoted members are in open or partially open position the device may be used as an ordinary level and when the pivoted arm 6 is swung laterally to the full extent of its movement the instrument may be used as a square.

In using the device for ascertaining the altitude of any desired object the free end of the segmental plate 22 is inserted in the slot 24 after which the operator sights along the outer edge of the pivoted member 6 until said member is in alinement with the desired object, after which the clamping screw 25 is adjusted and the height of the object ascertained by reference to the graduations on the scale.

When the device is not in use the pivoted member 6 is swung downwardly on the member 5 to the position shown in Fig. 3 of the drawings and in which position the device may also be used as a level or plumb, the recesses 18 permitting the operator to see the spirit tube when the instrument is used for this purpose.

Attention is called to the fact that when the instrument is in closed position the intermediate curved portion of the segmental plate 22 will be seated in the slot 21 of the pivoted member 6, while the free end of said plate will be seated in the adjacent opening 15 in the member 5 thus permitting the instrument to be compactly folded for transportation or shipment.

Suitable wear plates 27' and 28 are preferably counter-sunk in the outer faces of the members 5 and 6 in order to prevent excessive wear on the same.

From the foregoing description it will be seen that there is provided an extremely simple, inexpensive and efficient device admirably adapted for the attainment of the ends in view.

Having thus described the invention what is claimed is:

1. An instrument of the class described including pivotally united members one of which is provided with an elongated opening, a graduated segment pivotally mounted on the opposite member and adapted to enter the opening when the pivoted members are folded, there being a transverse recess formed in one of the members and intersected by the elongated opening for the reception of the free end of the segment when said members are in open position.

2. An instrument of the class described including pivotally united members one of which is provided with intersecting longitudinal and transverse openings, a graduated segmental plate pivotally mounted on the other member and adapted to engage the longitudinal opening in the mating member when said members are folded, the free end of the plate being adapted to enter the transverse opening when the members are moved to open position, and a clamping screw carried by said mating member and adapted to engage the segmental plate at the transverse opening.

3. An instrument of the class described including pivotally united members one of which is provided with a plate having spaced elongated slots formed therein, there being openings formed in the body of the member and communicating with said slots, a graduated segmental plate pivotally mounted in one of the openings and having its free end normally extended through the adjacent slot and seated in the opposite opening, there being a longitudinal opening formed in the adjacent pivoted member and adapted to receive the intermediate portion of the segmental plate when the pivoted members are moved to folded position.

4. An instrument of the class described including pivotally united members movable to a position at right angles to each other to form a square, one of said members being provided with a spirit tube and the other member having a longitudinal slot formed therein, a graduated segment pivotally mounted on one of the members and adapted to enter the opening in the opposite member when said members are moved to closed position, there being a transverse opening formed in one of the members and intersecting the longitudinal opening for the reception of the free end of the segmental plate.

5. An instrument of the class described including pivotally united members movable to a position at right angles to each other to form a square, one of said members being provided with a spirit tube and the mating member with a longitudinally disposed opening, a graduated segment pivotally mounted on the tube carrying member and adapted to enter the opening in the mating member when said members are moved to folded position, there being a transverse opening formed in the mating member and intersecting the longitudinal opening for the reception of the free end of the segment, a clamping screw carried by the mating member and adapted to engage and clamp the segmental plate at the transverse opening, and a compass countersunk in the upper face of the tube carrying member.

6. An instrument of the class described including pivotally united members movable to a position at right angles to each other, one of said members being provided with a spirit tube and having oppositely disposed recesses formed therein and inclined in the direction of the spirit tube, there being intersecting longitudinal and transverse openings formed in the mating member, a plate secured to the inner face of said mating member and having a longitudinal slot formed therein and communicating with the adjacent opening, a graduated segmental plate pivotally mounted on the tube carrying member and movable through the slot in the plate into said opening when the pivoted members are moved to folded position, the free end of the segmental plate being adapted to enter the transverse opening when said members are moved to open position, and a clamping screw carried by said mating member and adapted to engage the segmental plate at the transverse recess.

In testimony that I claim the foregoing as my own, I have hereto affixed my signature in the presence of two witnesses.

CHARLES JULYUS CRAMER.

Witnesses:
FRANK FRITSCH,
W. A. B. AUSTIN.